(12) United States Patent
Baartman et al.

(10) Patent No.: US 6,256,287 B1
(45) Date of Patent: Jul. 3, 2001

(54) METHOD OF MANUFACTURING A LENS SYSTEM COMPRISING TWO LENS ELEMENTS

(75) Inventors: Jan P. Baartman; Jan W. Aarts, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/294,608

(22) Filed: Apr. 19, 1999

(30) Foreign Application Priority Data

Apr. 17, 1998 (EP) .................................................. 98201239

(51) Int. Cl.[7] .................................................. G11B 7/00
(52) U.S. Cl. .............................................................. 369/244
(58) Field of Search .................................... 369/244, 249, 369/248, 247, 246, 44.14–44.42; 359/811–823

(56) References Cited

U.S. PATENT DOCUMENTS

| | | | |
|---|---|---|---|
| 4,167,269 | * | 9/1979 | Hatchett et al. ...................... 369/249 |
| 4,693,569 | * | 9/1987 | Offner ................................... 359/366 |
| 5,095,477 | * | 3/1992 | Shimozawa ........................... 369/112 |
| 5,107,485 | * | 4/1992 | Chandler ............................... 369/244 |
| 5,111,449 | * | 5/1992 | Kurata et al. ....................... 369/44.37 |
| 5,258,971 | * | 11/1993 | Yamamoto et al. ................... 369/219 |
| 5,383,052 | * | 1/1995 | Okazaki et al. ...................... 359/364 |
| 5,479,386 | * | 12/1995 | Takeshita et al. .................. 369/44.14 |
| 5,521,899 | * | 5/1996 | Taki ...................................... 369/244 |
| 5,610,899 | * | 3/1997 | Nomura ................................ 369/249 |
| 5,712,842 | | 1/1998 | Yamamoto et al. .................. 369/112 |
| 5,880,894 | * | 3/1999 | Blakley ................................. 359/819 |

FOREIGN PATENT DOCUMENTS

19623419 * 12/1997 (DE) .

* cited by examiner

Primary Examiner—Hoa T. Nguyen
Assistant Examiner—Franklin D. Altman, III (57) ABSTRACT

In an optical recorder and/or player the lens system of the scanning device focuses the light beam into a scanning spot on the information carrier. The lens system includes a main or objective lens and an auxiliary or solid immersion lens to provide the large numerical aperture required for scanning information carriers with a high information density, such as high-density compact discs. At least one lens, in particular the main lens, is suspended in a housing in a direction parallel to the optical axis of the lens system by two elastically deformable mounting elements. When viewed parallel to the optical axis, the mounting elements are distal from each other, and each allow tilting movements of the lens about tilt axes perpendicular to the optical axis, and are substantially undeformable in directions perpendicular to the optical axis. During manufacture of the lens system, the lenses are aligned relative to each other by shifting at least one of the mounting elements in directions perpendicular to the optical axis. The lenses may be positioned parallel to each other by shifting one of the mounting elements in a direction perpendicular to the optical axis, and centered relative to each other by shifting the non-suspended lens in a direction perpendicular to the optical axis. Thus, allowing accurate alignment of the lenses relative to each other using a simple manipulator with limited positioning possibilities.

23 Claims, 5 Drawing Sheets

METHOD OF MANUFACTURING A LENS SYSTEM COMPRISING TWO LENS ELEMENTS

FIELD OF THE INVENTION

The invention relates to optical disk drives for reading and writing information in tracks of a rotating disk and is most closely related to optical lens systems for focusing the scanning beam into a spot on the disk in such optical disk drives.

BACKGROUND OF THE INVENTION

The invention relates to a method of manufacturing an optical lens system including a housing, a first lens element having a first optical axis, and a second lens element having a second optical axis. According to the method, the lens elements, before being secured to the housing, are aligned relative to each other such that the optical axes of the lens elements coincide.

The invention further relates to an optical scanning device for scanning an information track of an optically scannable information carrier. The scanning device includes a radiation source, an optical lens system having an optical axis for focusing a radiation beam supplied, in operation, by the radiation source into a scanning spot on the information carrier, and a first actuator for displacing the lens system in a direction parallel to the optical axis. The lens system includes a first lens element, a second lens element and a second actuator for displacing the first lens element and the second lens element relative to each other.

The invention also relates to an optical player including a table which can be rotated about an axis of rotation, an optical scanning device for scanning an information track of an optically scannable information carrier which can be arranged on the table, and a displacement device which displaces the scanning device, in operation, relative to the axis of rotation, predominantly in a radial direction.

An optical lens system manufactured in accordance with a method of the type mentioned in the opening paragraph, as well as an optical scanning device and an optical player of the types mentioned in the opening paragraphs are known from U.S. Pat. No. 5,712,842. The known optical lens system used in the known optical scanning device includes an objective lens and a relatively small, so-called solid immersion lens, which is arranged between the objective lens and the information carrier to be scanned. By using the solid immersion lens, the known lens system has a relatively large numerical aperture, so that a relatively small scanning spot on the information carrier to be scanned is obtained. As a result, the known scanning device can suitably be used to scan information carriers having relatively small elementary information characteristics, i.e. information carriers having a relatively high information density, such as a high-density CD. Using the first actuator of the known scanning device, the lens system is displaced parallel to the optical axis, thus enabling the scanning spot to be focused on the information layer of the information carrier. Using the second actuator of the known scanning device, the solid immersion lens is displaced relative to the objective lens in a direction parallel to the optical axis, thus enabling a spherical aberration of the radiation beam in a transparent protective layer of the information carrier between the information layer and the scanning device to be corrected.

The objective lens of the known optical lens system is secured to the housing of the lens system in a fixed position, while the solid immersion lens is secured to the housing via a leaf spring. For a good optical operation of the lens system, the optical axes of the objective lens and the solid immersion lens must coincide as much as possible. To achieve this, in the course of the manufacture of the lens system, the objective lens and the solid immersion lens are aligned relative to each other, before being secured to the housing of the lens system, in such a manner that the optical axes of the objective lens and the solid immersion lens coincide as much as possible.

The above citations are hereby incorporated in whole by reference.

SUMMARY OF THE INVENTION

It is an object of the invention to provide a method of the type mentioned in the opening paragraphs, by which the lens elements of the lens system to be manufactured can be accurately aligned relative to each other by simple auxiliary apparatus, before they are secured to the housing of the lens system.

To achieve this, at least the first lens element is secured to the housing via two elastically deformable mounting elements. The mounting elements, when viewed parallel to the first optical axis, are arranged at some distance from each other and each individually allow tilting of the first lens element about tilting axes extending perpendicularly to the first optical axis. The mounting elements, when viewed in directions at right angles to the first optical axis, are substantially undeformable. At least one of the mounting elements is displaced, before being secured to the housing, in a direction transverse to the first optical axis to bring the lens elements into mutually parallel positions. In order to bring the lens elements of the lens system into a position in which the optical axes of the lens elements coincide, at least one of the lens elements must be tilted, during the aligning process, about a tilt axis directed at right angles to its optical axis, so that the lens elements are brought into mutually parallel positions, and, during aligning, at least one of the lens elements must be displaced at right angles to its optical axis, so that the lens elements are centered relative to each other. If, before being secured to the housing, at least one of the mounting elements is displaced in a direction transverse to the first optical axis, the first lens element is tilted about a tilt axis directed perpendicularly to the first optical axis, thereby elastically deforming the two mounting elements. Because the lens elements are brought into mutually parallel positions, in the manner described above, by displacing at least one of the mounting elements only in a linear direction transverse to the first optical axis, and that such linear displacements can be carried out with great accuracy, the lens elements can be very accurately brought into mutually parallel positions by a simple manipulator having limited possibilities of displacement. Since, viewed in directions perpendicular to the first optical axis, the mounting elements are substantially undeformable, after securing the mounting elements to the housing, viewed perpendicularly to the first optical axis, a very rigid support of the first lens element relative to the housing is obtained, while the cooperation between the two mounting elements secured to the housing additionally provides for a very high tilt resistance of the first lens element relative to the housing about tilt axes directed at right angles to the first optical axis. In this manner, the mutual positions of the two lens elements obtained during aligning are accurately maintained after securing the mounting elements to the housing.

In a particular embodiment of the method in accordance with the invention, before being secured to the housing, the second lens element is displaced in a direction transverse to the second optical axis in order to center the lens elements relative to each other. Because the lens elements are centered relative to each other, as described above, by displacing the second lens element exclusively in a linear direction transverse to the second optical axis, and that such linear displacements can be carried out with great accuracy, the lens elements can also be very accurately centered relative to each other by a simple manipulator having limited possibilities of displacement.

In a further embodiment, before being secured to the housing, the mounting elements are displaced over equal distances and in a same direction transverse to the first optical axis in order to center the lens elements relative to each other, and over equal distances, in mutually opposite directions transverse to the first optical axis in order to bring the lens elements into mutually parallel positions. The first lens element is displaced at right angles to the first optical axis by displacing both mounting elements over equal distances and in an equal direction transverse to the first optical axis, while the first lens element is tilted about a tilt axis directed at right angles to the first optical axis, by displacing the two mounting elements over equal distances, in opposite directions transverse to the first optical axis. Because the lens elements are, respectively, mutually centered and brought into mutually parallel positions by two different methods of displacing the mounting elements, the lens elements are univocally and accurately brought into positions in which the optical axes of the lens elements coincide.

In a particular embodiment, the second lens element is secured to a first part of the housing, while a first mounting element is secured to a second part of the housing and a second mounting element is secured to a third part of the housing, the first part, second part and third part of the housing being fixed with respect to each other after the lens elements are aligned relative to each other. By using the three parts of the housing, the aligning of the lens elements is further simplified because the parts can be coupled in a simple manner to a manipulator necessary for aligning. In addition, after aligning the lens elements, the parts can be fixed relative to each other in a simple manner.

In a further embodiment, the first part of the housing is provided with a sliding surface which extends transversely to the second optical axis. The second part of the housing is provided with a first sliding surface which extends transversely to the first optical axis and with a second sliding surface which extends transversely to the first optical axis and serves to co-operate with the sliding surface of the first part. The third part of the housing is provided with a sliding surface, which extends transversely to the first optical axis and serves to co-operate with the first sliding surface of the second part. By using the sliding surfaces which extend transversely to the optical axes, a further simplification of the alignment of the lens elements is achieved because, during the aligning process, the three parts of the housing can be mutually slided over the co-operating sliding surfaces in directions transverse to the optical axes.

In yet another embodiment, the first part, the second part and the third part of the housing are fixed relative to each other by glued joints. By using the glued joints, the three parts of the housing are fixed relative to each other in a simple manner. The glued joints are preferably formed between the co-operating sliding surfaces of the three parts, because shrinkage or expansion of the glued joints formed there occurs predominantly in a direction parallel to the optical axes of the lens elements and hence substantially does not affect the mutual alignment of the lens elements.

In a particular embodiment, the mounting elements are each provided with a first, substantially ring-shaped part which is secured to the housing, and with a second, substantially ring-shaped part, which is secured to the first lens element. The ring-shaped parts of a first mounting element is interconnected by at least three bendable bridges which are arranged at regular intervals and which extend in a plane transverse to the first optical axis, while the ring-shaped parts of a second mounting element are interconnected by at least two bendable bridges which extend in a plane transverse to the first optical axis. If the first mounting element is provided with three bendable bridges, and the second mounting element is provided with two bendable bridges, a so-called statically determined, i.e. substantially stress-free suspension of the first lens element in the housing is obtained, and the first lens element can only be displaced in a direction parallel to the first optical axis. If a larger number of bendable bridges is used, a suspension of the first lens element in the housing is obtained which, although not statically determined, still enables the first lens element to be displaced parallel to the first optical axis.

In a further embodiment, the mounting elements are each made from a single plate of a material. Also, the mounting elements are made in a simple and accurate manner by, for example, an etching process.

In yet another embodiment, the first mounting element and the second mounting element are each provided with three bendable bridges which are placed at regular intervals. Also, the lens system is provided with two identical mounting elements, so that the construction of the lens system is further simplified.

In a particular embodiment, the bendable bridges of the mounting elements are each provided with a uniformly bendable spoke which extends substantially in a tangential direction relative to the optical axis of the first lens element. By using the uniformly bendable spokes, a simple and robust construction of the mounting elements is obtained.

In a further embodiment, the bendable bridges of the mounting elements are each provided with a relatively rigid strip which extends substantially in a tangential direction relative to the optical axis of the first lens element and is connected, by two flexible joints, to the two ring-shaped parts of the relevant mounting element. By using the strips and flexible joints, the mounting elements can be manufactured in a simple manner by providing a number of incisions.

A further object of the invention is to provide an optical scanning device and an optical player of the types mentioned in the opening paragraph, in which the lens elements of the optical lens systems employed therein are accurately aligned relative to each other, and in which the mutual positions of the lens elements obtained by aligning them relative to each other can be accurately maintained.

To achieve this, in the optical scanning device in accordance with the invention, the housing of the lens system can be displaced in a direction parallel to the optical axis by the first actuator, while the first lens element of the lens system can be displaced relative to the housing by the second actuator, in a direction parallel to the optical axis.

An optical player in accordance with the invention uses an optical scanning device in accordance with the invention as described above.

These and other aspects of the invention will be apparent from and elucidated with reference to the embodiments described hereinafter.

DETAILED DESCRIPTION OF THE PREFERRED EMBODIMENT

Figure 1:
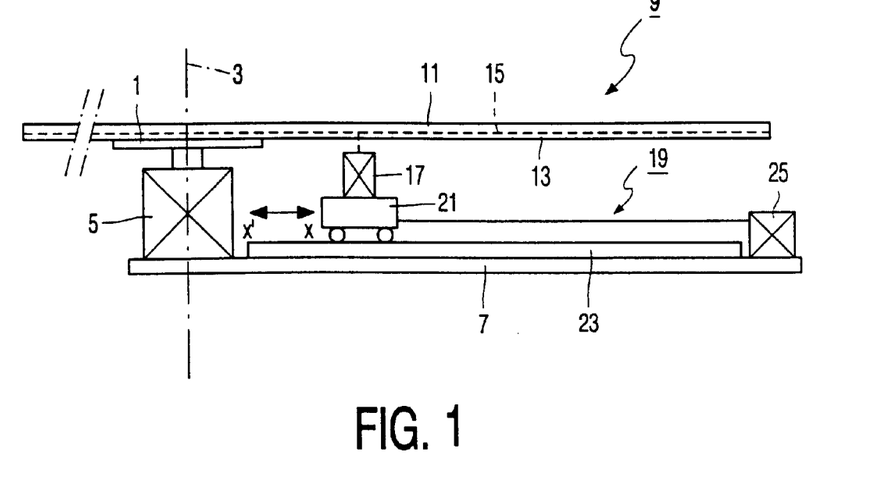
FIG. 1 schematically shows an optical player in accordance with the invention.

FIG. 1 schematically shows an optical player in accordance with the invention, which includes a table 1 which can be rotated about an axis of rotation 3 and can be driven by an electric motor 5 which is secured onto a frame 7. On table 1, an optically scannable information carrier 9, such as a CD, can be arranged which is provided with a disc-shaped support 11 and a transparent protective layer 13. A side of the support 11 bordering on the protective layer 13 forms an information layer 15 of the information carrier 9 on which a spiral-shaped information track is present. The optical player further includes an optical scanning device 17 for optically scanning the information track of the information carrier 9.

The scanning device 17 can be displaced by a displacement device 19 of the optical player relative to the axis of rotation 3 predominantly in two opposite radial directions X and X'. To this end, the scanning device 17 is secured to a slide 21 of the displacement device 19 which is further provided with a straight guide 23 provided on the frame 7 and extending parallel to the X direction, over which guide the slide 21 is guided in a displaceable manner. Device 19 also includes an electric motor 25 which displaces the slide 21 over the guide 23. In operation, an electrical control unit of the optical player, not shown in the Figures, controls the motors 5 and 25, causing the information carrier 9 to rotate about the axis of rotation 3, and simultaneously, the scanning device 17 to be displaced parallel to the X-direction, in such a manner that the spiral-shaped information track present on the information carrier 9 is scanned by the scanning device 17. During the scanning, information present on the information track can be read by the scanning device 17 or information can be written on the information track by the scanning device 17.

Figure 2:
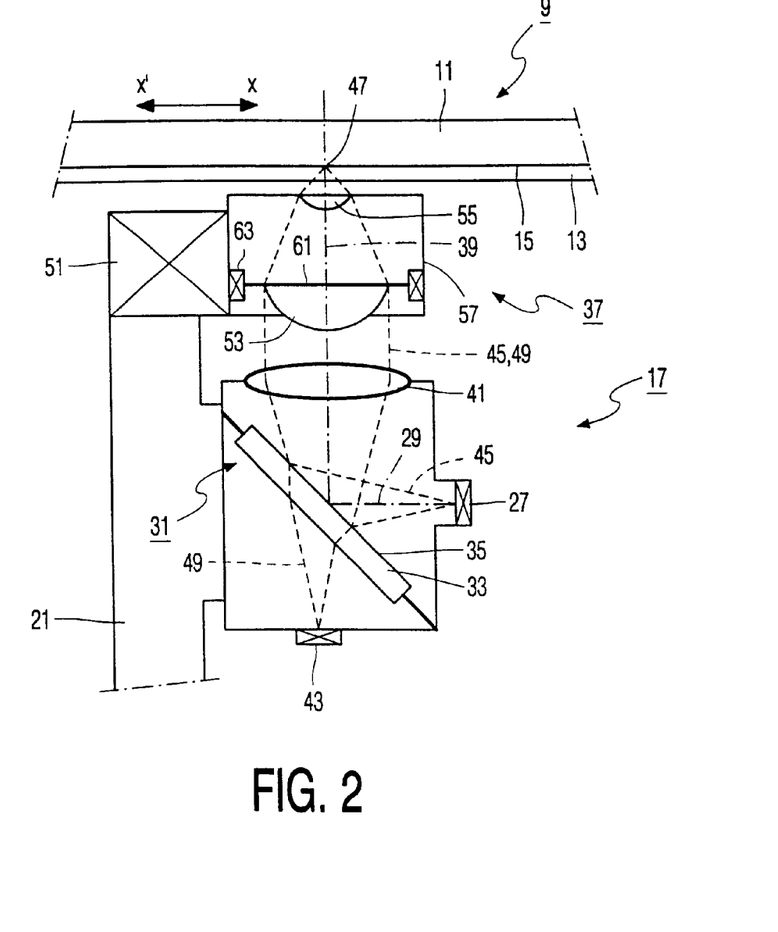
FIG. 2 schematically shows an optical scanning device in accordance with the invention, which is used in the optical player in accordance with FIG. 1.

The optical scanning device 17 in accordance with the invention, used in the optical player in accordance with the invention is schematically shown in FIG. 2. The scanning device 17 is provided with a radiation source 27, for example a semiconductor laser, with an optical axis 29. The scanning device 17 further includes a radiation beam splitter 31 which includes a transparent plate 33 which is arranged at an angle of 45° relative to the optical axis 29 of the radiation source 27 and which includes a reflective surface 35 facing the radiation source 27. The scanning device 17 further includes an optical lens system 37 with an optical axis 39 and a collimator lens 41 arranged between the radiation beam splitter 31 and the lens system 37. The optical axis 39 of the lens system 37 and the optical axis 29 of the radiation source 27 include an angle of 90°. The scanning device 17 further includes an optical detector 43 which, relative to the lens system 37, is arranged behind the radiation beam splitter 31, said optical detector being of a type which is known per se and customarily used. In operation, the radiation source 27 generates a radiation beam 45 which is reflected by the reflective surface 35 of the radiation beam splitter 31 and focused by the lens system 37 into a scanning spot 47 on the information layer 15 of the information carrier 9.

The radiation beam 45 is reflected by the information layer 15 into a reflected radiation beam 49 which is focused on the optical detector 43 via the lens system 37, the collimator lens 41 and the radiation beam splitter 31. For reading information present on the information carrier 9, the radiation source 27 generates a continuous radiation beam 45, and the optical detector 43 supplies a detection signal which corresponds to a series of elementary information characteristics on the information track of the information carrier 9, which elementary information characteristics are successively present in the scanning spot 47. For writing information on the information carrier 9, the radiation source 27 generates a radiation beam 45 which corresponds to the information to be written, in the scanning spot 47 a series of successive elementary information characteristics being generated on the information track of the information carrier 9.

As is also shown in FIG. 2, the scanning device 17 includes a first actuator 51 which displaces the lens system 37 over relatively small distances parallel to the optical axis 39 of the lens system 37, and over relatively small distances parallel to the X-direction. By displacing the lens system 37 using the first actuator 51 in a direction parallel to the optical axis 39, the scanning spot 47 is focused with a desired degree of accuracy on the information layer 15 of the information carrier 9. By displacing the lens system 37 using the first actuator 51 in a direction parallel to the X-direction, the scanning spot 47 is maintained with a desired accuracy on the information track to be followed. To this end, the first actuator 51 is driven by the above-mentioned control unit of the optical player, which receives both a focus-error signal and a track error signal from the optical detector 43.

Figure 3:
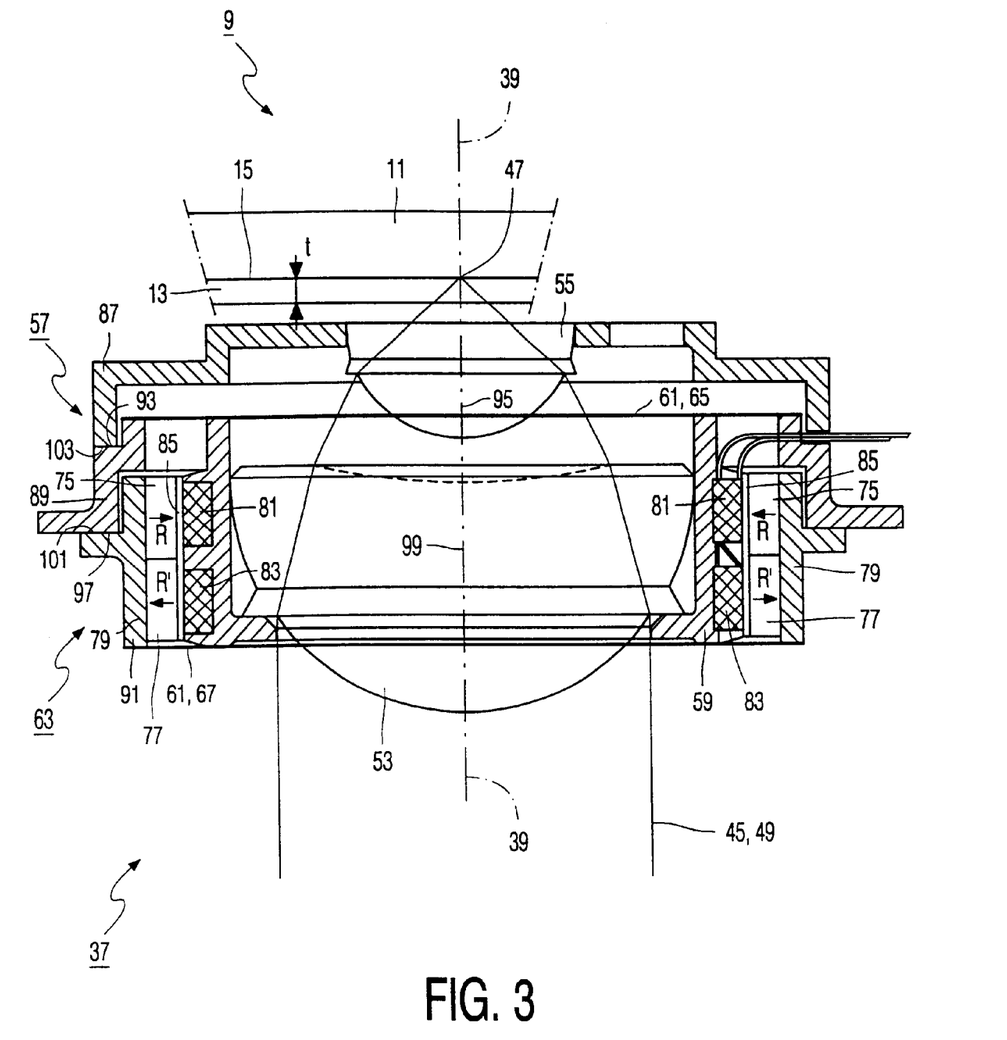
FIG. 3 shows an optical lens system manufactured in accordance with a method in accordance with the invention, which is used in the optical scanning device in accordance with FIG. 2.

The optical lens system 37 used in the optical scanning device 17, which lens system is manufactured in accordance with a method of the invention, is shown in detail in FIG. 3 and includes a first lens element 53 and a second lens element 55. The first lens element 53 is an objective lens and constitutes a main lens of the lens system 37. The second lens element 55 is a so-called solid immersion lens, which is arranged between the objective lens and the information carrier 9 to be scanned, and which constitutes a relatively small auxiliary lens of the lens system 37. By employing, apart from the main lens 53, the auxiliary lens 55, the lens system 37 has a relatively large numerical aperture, so that the scanning spot 47 on the information layer 15 of the information carrier 9 is relatively small. As a result, the scanning device 17 is suitable for scanning optical information carriers having relatively small elementary information characteristics, i.e. optical information carriers having a relatively high information density, such as a high-density CD. As shown in FIG. 3, the auxiliary lens 55 is secured in a fixed position to a housing 57 of the lens system 37, which housing 57 is secured to the first actuator 51 and hence can be displaced parallel to the optical axis 39 of the lens system 37 using the first actuator 51. The main lens 53 is secured to a substantially ring-shaped holder 59 which, viewed parallel to the optical axis 39, is elastically suspended in the housing 57 an elastically deformable mounting unit 61, which will be described in greater detail hereinbelow, the main lens 53 being displaceable, parallel to the optical axis 39, relative to the housing 57, thereby elastically deforming the mounting unit 61. As shown in FIG. 3, the lens system .37 further includes a second actuator 63, which will be described in greater detail hereinbelow, by means of which the main lens 53 can be displaced, parallel to the optical axis 39 of the lens system 37, relative to the housing 57 and the auxiliary lens 55. By displacing the main lens 53 relative to the auxiliary lens 55, in a direction parallel to the optical axis 39, using the second actuator 63, a spherical aberration of the radiation beam 45 in the transparent protective layer 13 of the information carrier 9 is corrected. Such a spherical aberration is predominantly caused by fluctuations in the thickness t of the protective layer 13. The second actuator 63 is also driven by the control unit of the optical player, which receives an error signal from a sensor of the scanning device 17, not shown in the Figures for the sake of simplicity, by which sensor, for example, the thickness t of the protective layer 13 near the scanning spot 47 can be measured.

Figure 4:
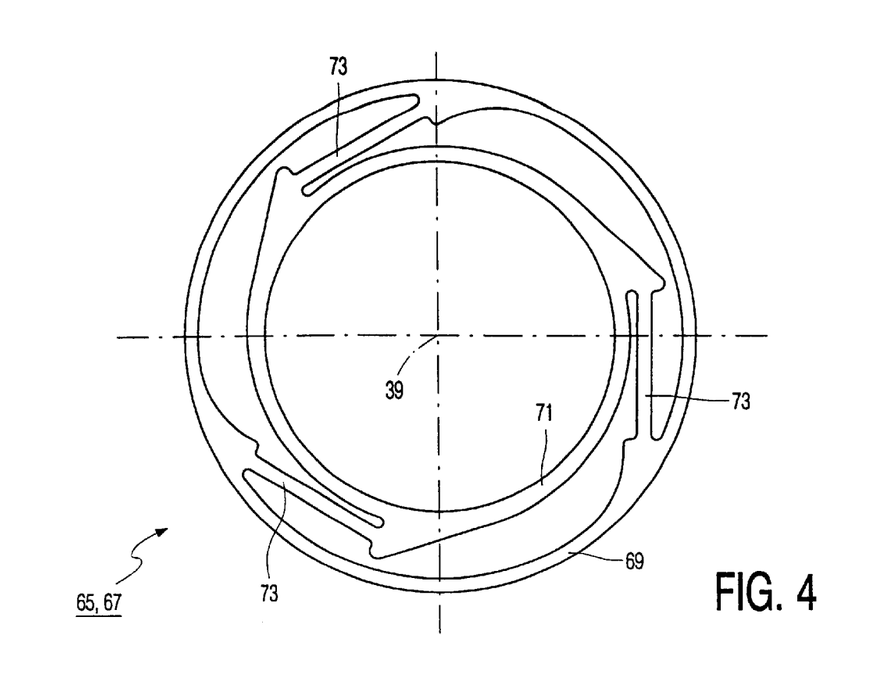
FIG. 4 shows an elastically deformable mounting element of the optical lens system in accordance with FIG. 3, FIGS. 5a and 5b schematically show how two lens elements of the lens system shown in FIG. 3 are aligned using a method in accordance with the invention, FIGS. 6a and 6b schematically show how two lens elements of the lens system shown in FIG. 3 are aligned using an alternative method in accordance with the invention.

As shown in FIG. 3, the mounting unit 61 includes two mounting elements 65, 67 which, viewed parallel to the optical axis 39, are arranged at a distance from each other and extend transversely to the optical axis 39. The mounting elements 65, 67, which are identical and shown in detail in FIG. 4, are, viewed at right angles to the optical axis 39, substantially undeformable and, viewed parallel to the optical axis 39, elastically deformable. For this purpose, as shown in FIG. 4, the mounting elements 65, 67 are each provided with a first, predominantly ring-shaped portion 69 which is secured to the housing 57 of the lens system 37, and a second, predominantly ring-shaped portion 71 which is secured to the holder 59 of the main lens 53, the ring-shaped portions 69 and 71 being interconnected by three bendable bridges 73 which extend in a plane transverse to the optical axis 39 and are mutually placed at regular intervals. By using the two mounting elements 65, 67, the main lens 53 is given, viewed parallel to the optical axis 39, a freedom of displacement, while, viewed at right angles to the optical axis 39, a relatively rigid bearing of the main lens 53 relative to the housing 57 is obtained. The mounting elements 65, 67 each individually allow tilting movements of the main lens 53 about every tilt axis directed at right angles to the optical axis 39, but the co-operation between the two mounting elements 65, 67 provides the mounting unit 61 with a relatively high tilt resistance about every tilt axis directed perpendicularly to the optical axis 39, so that tilting of the main lens 53 relative to the housing 57 about tilt axes directed at right angles to the optical axis 39 is precluded as much as possible. By virtue thereof, it is achieved that a mutual alignment of the main lens 53 and the auxiliary lens 55 relative to each other, which is obtained during the manufacture of the lens system 37, and as a result of which the optical axes of the main lens 53 and the auxiliary lens 55 coincide as much as possible is maintained in operation to the extent possible.

As shown in FIG. 3, the second actuator 63, viewed parallel to the optical axis 39, is arranged between the two mounting elements 65, 67 of the mounting unit 61, so that the space available between the two mounting elements 65, 67 is efficiently used and a compact construction of the lens system 37 is obtained. The actuator 63 has two ring-shaped permanent magnets 75, 77 which, viewed parallel to the optical axis 39, are arranged one beside the other and secured to a substantially ring-shaped closing yoke 79, which is made of a magnetizable material and constitutes a separate part of the housing 57 of the lens system 37. The actuator 63 further includes two ring-shaped electric coils 81, 83 which are secured to the holder 59 of the main lens 53. Viewed parallel to the optical axis 39, the coils 81, 83 are also arranged next to each other, the coil 81 being arranged opposite the magnet 75 and the coil 83 being arranged opposite the magnet 77, while a ring-shaped air gap 85 is present between the magnets 75, 77 and the coils 81, 83. As shown in FIG. 3, the magnets 75, 77 are magnetized, relative to the optical axis 39, in opposite radial directions R and R'. The coils 81, 83 are wound in opposite directions relative to each other, so that, in operation, an electric current in the coil 81 and an electric current in the coil 83 flow in opposite directions. In this manner, it is achieved that the electromagnetic forces which, in operation, are exerted on the coils 81 and 83 by an interaction between a magnetic field of the magnets 75, 77 and the electric current in the coils 81, 83 are substantially equally directed. The holder 59 is made of a non-magnetizable material, so that the magnets 75, 77 do not exert magnetic forces on the holder 59, and mechanical loads on the mounting elements 65, 67, which are directed at right angles to the optical axis 39, are limited as much as possible.

In accordance with a method according to the invention of manufacturing the optical lens system 37, the auxiliary lens 55 is secured, in a fixed position, to a first part 87 of the housing 57, while the ring-shaped part 69 of the mounting element 65 is secured to a second part 89 of the housing 57, and the ring-shaped part 69 of the mounting element 67 is secured to a third part 91 of the housing 57. The three parts 87, 89, 91 of the housing 57 are shown in FIG. 3. In accordance with the method, the first part 87 of the housing 57 is provided with a ring-shaped sliding surface 93 which, in a situation shown in FIG. 3 in which the auxiliary lens 55 is secured to the first part 87, extends transversely to an optical axis 95 of the auxiliary lens 55. The third part 91 of the housing 57 is also provided with a ring-shaped sliding surface 97 which, in the situation shown in FIG. 3 in which the main lens 53 is secured to the third part 91 via the mounting element 67, extends transversely to an optical axis 99 of the main lens 53. The second part 89 of the housing 57 is provided with a first ring-shaped sliding surface 101 for co-operation with the sliding surface 97 of the third part 91, and with a second ring-shaped sliding surface 103 for co-operation with the sliding surface 93 of the first part 87. The sliding surfaces 101 and 103 of the second part 89 extend transversely to the optical axis 99 of the main lens 53, in the situation shown in FIG. 3 in which the main lens 53 is secured to the second part 89 via the mounting element 65.

Figure 5A:
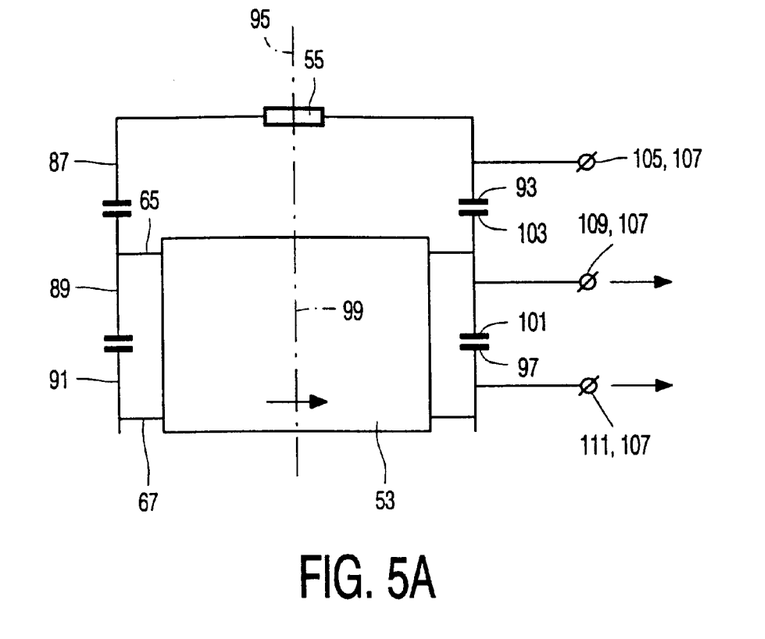
Figure 5B:
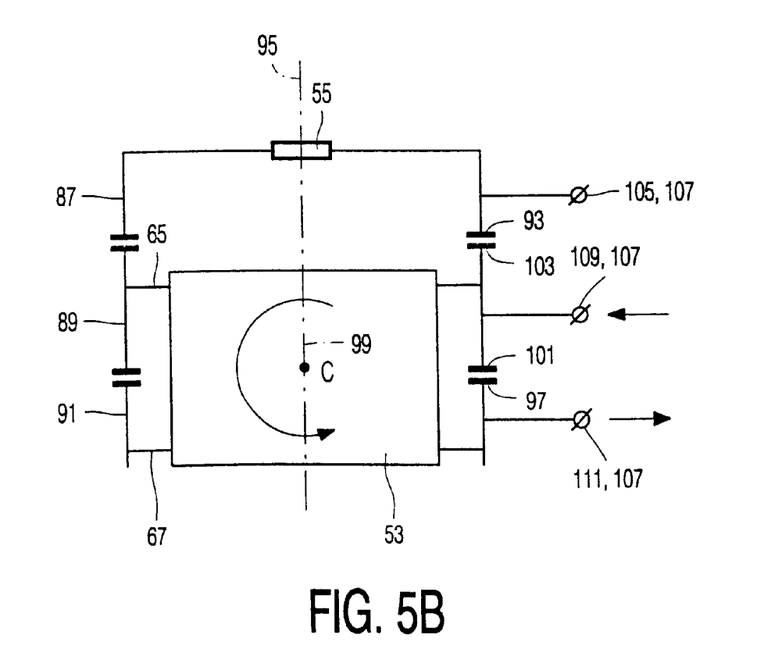

As schematically shown in FIGS. 5a and 5b, in accordance with the invention, the three parts 87, 89, 91 of the housing 57, including the main lens 53 and the auxiliary lens 55 attached thereto, are arranged on top of each other via the co-operating sliding surfaces 93, 103 and the cooperating sliding surfaces 97, 101. The first part 87 is coupled to a reference 105 of a manipulator 107, the second part 89 is coupled to a first effector 109 of the manipulator 107, and the third part 91 is coupled to a second effector 111 of the manipulator 107. Using manipulator 107, which for simplicity's sake is not shown in detail in the Figures, the main lens 53 and the auxiliary lens 55 of the lens system 37 to be manufactured are aligned relative to each other in such a manner that the optical axis 99 of the main lens 53 and the optical axis 95 of the auxiliary lens 55 coincide and hence constitute the optical axis 39 of the lens system 37. In order to align the optical axes 95 and 99 of, respectively, the auxiliary lens 55 and the main lens 53, the main lens 53 is displaced over a necessary distance relative to the auxiliary lens 55 by manipulator 107 in a direction transverse to the optical axis 99 of the main lens 53, so that the main lens 53 and the auxiliary lens 55 are centered relative to each other, and the main lens 53 is tilted through a necessary angle relative to the auxiliary lens 55 by the manipulator 107 about a tilt axis directed transversely to the optical axis 99 of the main lens 53, so that the optical axes 95 and 99 of the auxiliary lens 55 and the main lens 53 are brought into mutually parallel positions.

In order to enable the main lens 53 to be displaced relative to the auxiliary lens 55 in a direction transverse to the optical axis 99 of the main lens 53, the effectors 109 and 111 of the manipulator 107 are displaced over equal distances in a same direction transverse to the optical axis 99 of the main lens 53, as shown in FIG. 5a. Here, the second sliding surface 103 of the second part 89 of the housing 57 slides over the sliding surface 93 of the first part 87 of the housing 57. In order to be able to tilt the main lens 53 relative to the auxiliary lens 55 about a tilt axis C directed transversely to the optical axis 99 of the main lens 53, the effectors 109 and 111 of the manipulator 107 are displaced over equal distances, in opposite directions, transverse to the optical axis 99 of the main lens 53, as shown in FIG. 5b. Here, the second sliding surface 103 of the second part 89 of the housing 57 slides over the sliding surface 93 of the first part 87 of the housing 57, while the first sliding surface 101 of the second part 89 of the housing 57 slides over the sliding surface 97 of the third part 91 of the housing 57. The tilt axis C is situated between the two mounting elements 65 and 67. Since, as shown in FIGS. 5a and 5b, the main lens 53 and the auxiliary lens 55 are, respectively, centered relative to each other and brought into mutually parallel positions by two mutually different methods of displacing the second part 89 of the housing 57 with the mounting element 65 attached thereto and the third part 91 of the housing 57 with the mounting element 67 attached thereto, the main lens 53 and the auxiliary lens 55 are aligned relative to each other in a simple and accurate manner. Since the alignment of the main lens 53 and the auxiliary lens 55 takes place exclusively by displacing the second part 89 and the third part 91 of the housing 57 in directions transverse to the optical axis 99 of the main lens 53, the manipulator 107 may be of a simple type.

The three parts 87, 89, 91 of the housing 57 can be coupled to the manipulator 107 in a simple manner, for example by a clamp coupling, which leads to a further simplification of the alignment of the main lens 53 and the auxiliary lens 55. By using co-operating sliding surfaces 93 and 103, and the co-operating sliding surfaces 97 and 101, the main lens 53 and the auxiliary lens 55 can be readily handled during the aligning process, so that the alignment of the main lens 53 and the auxiliary lens 55 is further simplified.

After the main lens 53 and the auxiliary lens 55 are aligned relative to each other as described above, the three parts 87, 89, 91 of the housing 57 are fixed relative to each other. In the example of a method in accordance with the invention, as shown in the Figures, the three parts 87, 89, 91 are fixed relative to each other by providing an adhesive between the co-operating sliding surfaces 93 and 103 and between the co-operating sliding surfaces 97 and 101, which adhesive is cured after the alignment of the main lens 53 and the auxiliary lens 55. Since shrinkage or expansion of the adhesive provided between the co-operating sliding surfaces 93, 103 and between the co-operating sliding surfaces 97, 101 occurs mainly in a direction parallel to the optical axis 39 of the lens system 37, such shrinkage or expansion leads to hardly any relative displacements of the three parts 87, 89, 91 of the housing 57 in directions transverse to the optical axis 39 of the lens system 37, so that the alignment of the main lens 53 and the auxiliary lens 55 relative to each other is hardly disturbed by such shrinkage or expansion. It is noted that, in accordance with the invention, the three parts 87, 89, 91 of the housing may alternatively be fixed relative to each other in a different manner, such as by laser-welded joints.

Figure 6A:
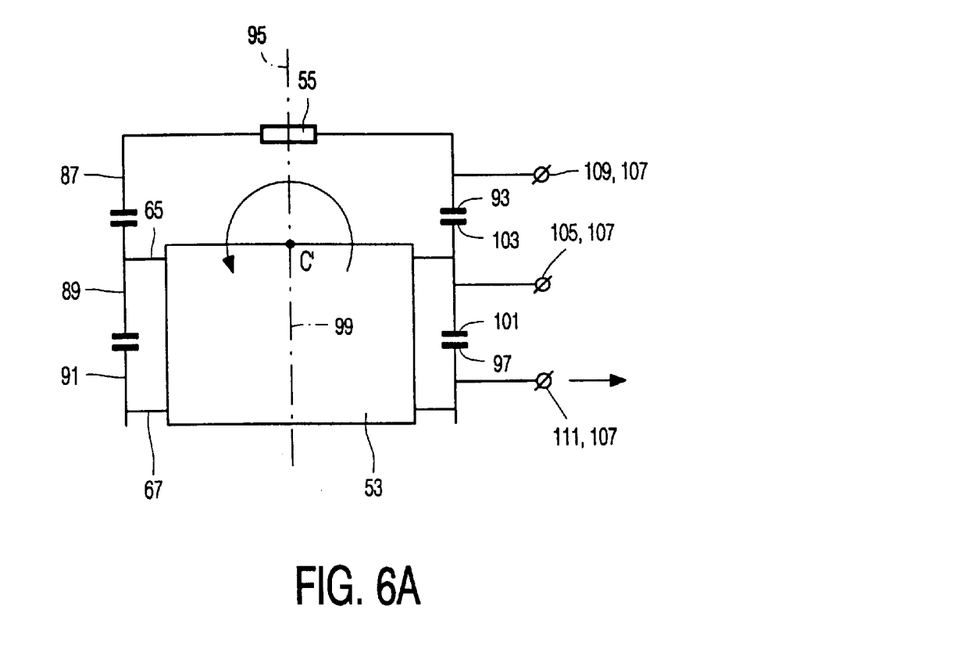
Figure 6B:
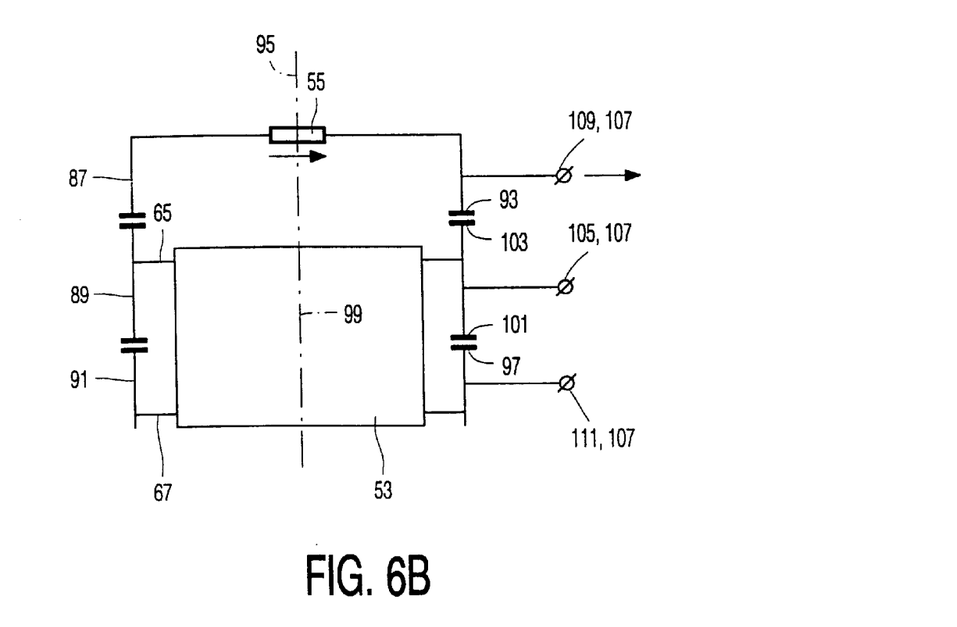

In accordance with the alternative method of the invention schematically shown in FIGS. 6a and 6b, the first part 87 of the housing 57 with the auxiliary lens 55 secured thereto, is coupled to the first effector 109 of the manipulator 107, the second part 89 of the housing 57 with the mounting element 65 secured thereto, is coupled to the reference 105 of the manipulator 107, and the third part 91 of the housing 57 with the mounting element 67 secured thereto is coupled to the second effector 111 of the manipulator 107. In this alternative method in accordance with the invention, the main lens 53 and the auxiliary lens 55 are brought into mutually parallel positions, as in the method shown in FIGS. 5a and 5b, by tilting the main lens 53 about a tilt axis C' which is directed perpendicularly to the optical axis 99 of the main lens 53. For this purpose, as schematically shown in FIG. 6a, only the second effector 111 of the manipulator 107 is displaced in a direction transverse to the optical axis 99 of the main lens 53, so that only the mounting element 67 is displaced in a direction transverse to the optical axis 99 of the main lens 53. The tilt axis C' is consequently situated, for example, near the mounting element 65 or near the surface of the main lens 53 facing the auxiliary lens 55. Here, the first sliding surface 101 of the second part 89 of the housing 57 slides over the sliding surface 97 of the third part 91 of the housing 57.

In the alternative method in accordance with the invention, the main lens 53 and the auxiliary lens 55 are centered relative to each other by displacing the auxiliary lens 55 in a direction transverse to the optical axis 95 of the auxiliary lens 55. For this purpose, as schematically shown in FIG. 6b, only the first effector 109 of the manipulator 107 is displaced in a direction transverse to the optical axis 95 of the auxiliary lens 55, so that only the first part 87 of the housing 57 with the auxiliary lens 55 attached thereto is displaced in a direction transverse to the optical axis 95 of the auxiliary lens 55. Here, the sliding surface 93 of the first part 87 of the housing 57 slides over the second sliding surface 103 of the second part 89 of the housing 57. Since, in the alternative method, during aligning the main lens 53 and the auxiliary lens 55, tilting of the main lens 53 and displacing the auxiliary lens 55 take place by displacing, respectively, only the second effector 111 of the manipulator 107 and only the first effector 109 of the manipulator 107, a very simple embodiment of the method in accordance with the invention is obtained.

Figure 7:
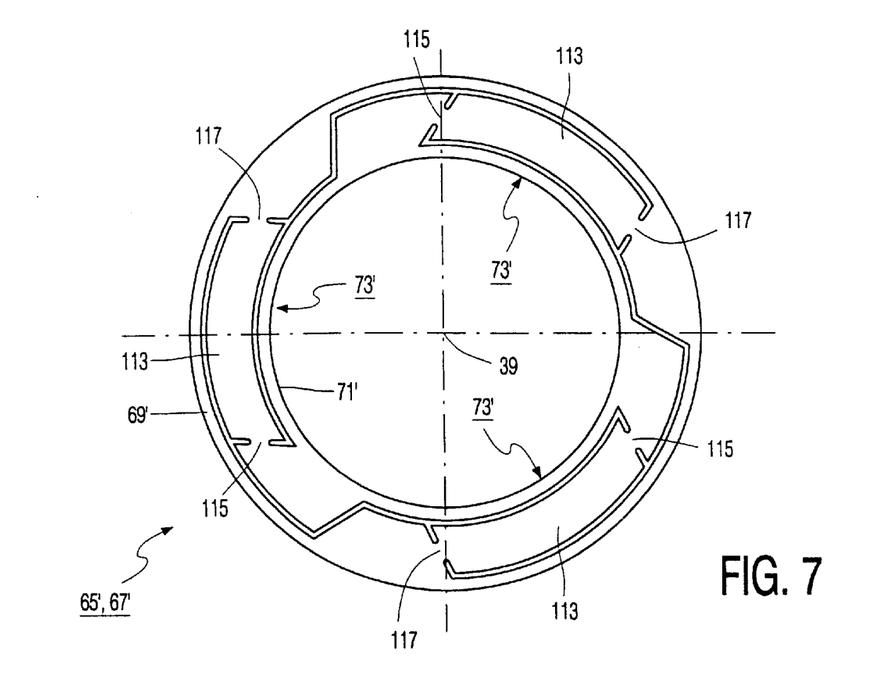
FIG. 7 shows an alternative elastically deformable mounting element of the optical lens system shown in FIG. 3.

As described hereinabove, the mounting elements 65, 67 of the lens system 37 each include three bendable bridges 73 which are arranged at regular distances from each other and extend in a plane transverse to the optical axis 39. As shown in FIG. 4, the bendable bridges 73 each include a uniformly bendable spoke which extends mainly in a tangential direction relative to the optical axis 39 of the lens system 37. By virtue thereof, a simple and robust construction of the mounting elements 65, 67 is obtained. FIG. 7 shows an alternative mounting element 65', 67', which may be used in the lens system 37 instead of the mounting element 65, 67 shown in FIG. 4. In accordance with the invention, the alternative mounting element 65', 67' is provided, like the mounting element 65, 67, with a first, predominantly ring-shaped portion 69', which is secured to the housing 57 of the lens element 37, and with a second, predominantly ring-shaped portion 71' which is secured to the holder 59. The ring-shaped portions 69', 71' of the alternative securing element 65', 67' shown in FIG. 7 are interconnected by three bendable bridges 73' which are arranged at regular distances from each other and extend in a plane transverse to the optical axis 39, each bridge being provided with a relatively rigid strip 113 which extends predominantly in a tangential direction relative to the optical axis 39 and is connected via two flexible joints 115, 117 to the two ring-shaped portions 69', 71'. By using strips 113 and flexible joints 115, 117, the mounting elements 65', 67' can be manufactured in a simple manner by providing a relatively small number of incisions in a plate of a material.

The mounting elements 65, 67 and the alternative mounting elements 65', 67' can be manufactured from a single plate of a material by, for example, a cutting or etching process. Since the mounting elements 65, 67 and 65', 67' are identical, a simple construction of the lens system 37 is obtained. It is noted that in accordance with the invention also lens systems 37 can be manufactured in which the mounting elements 65, 67, 65', 67' used therein include a different number of bendable bridges 73, 73'. In accordance with the invention, however, a first one of the mounting elements 65, 67, 65', 67' should be provided with at least three bendable bridges 73, 73' which are arranged at regular intervals and extend in a plane transverse to the optical axis 39, and a second one of the mounting elements 65, 67, 65', 67' should be provided with at least two bendable bridges 73, 73' which extend in a plane transverse to the optical axis 39.

If the first mounting element 65, 67, 65', 67' is provided, as described above, with three bendable bridges 73, 73', and the second mounting element 65, 67, 65', 67' is provided, as described above, with two bendable bridges 73, 73', a so-called statically determined, i.e. substantially stress-free suspension of the main lens 53 in the housing 57 is obtained, in which case the main lens 53 can only be displaced in a direction parallel to the optical axis 39 of the lens system 37. This is based on the recognition that each individual, bendable bridge 73, 73' predominantly serves as a mechanical rod with which substantially exclusively forces directed parallel to a longitudinal direction of the bendable bridge 73, 73' are transmitted. If a larger number of bendable bridges 73, 73' extending in a plane transverse to the optical axis 39 of the lens system 37 are used in the mounting elements 65, 67, 65', 67', then the main lens 53 is suspended in the housing 57 in a manner which is not statically determined, but which also enables the main lens 53 to be displaced in a direction parallel to the optical axis 39.

The above-described optical player in accordance with the invention can be used, during scanning the information track of the information carrier 9, to read information present on the information track or write information on the information track. It is noted that the invention also relates to optical players which can only be used to read information present on an information track of an information carrier.

In accordance with the above-described methods according to the invention, the main lens 53 and the auxiliary lens 55 are aligned relative to each other by tilting the main lens 53 about a tilt axis C, C' which is directed at right angles to the optical axis 99 of the main lens 53, and by displacing the main lens 53 or the auxiliary lens 55 in a direction transverse to the optical axis 99, 95 of the main lens 53 or the auxiliary lens 55. It is further noted that the invention also includes methods in which, during alignment, the main lens 53 and the auxiliary lens 55 are only brought into mutually parallel positions by tilting the main lens 53 about a tilt axis which is directed transversely to the optical axis 99 of the main lens 53. It is further noted that, in accordance with the invention, the main lens 53 and the auxiliary lens 55 can also be brought into mutually parallel positions by securing the auxiliary lens 55, instead of the main lens 53, to two similar mounting elements and displacing at least one of the mounting elements in a direction transverse to the optical axis 95 of the auxiliary lens 55. The invention further includes methods of manufacturing a lens system, in which the two lens elements employed therein are each secured to the housing by two similar mounting elements. During aligning the lens elements of such a lens system relative to each other, one of the two lens elements may be manipulated in a manner shown in FIGS. 5a, 5b or 6a, 6b, or both lens elements may be manipulated each in a manner shown in FIGS. 5a, 5b or 6a, 6b.

It is further noted that the invention also relates to a method of manufacturing a lens system in which the two lens elements employed therein cannot be displaced relative to each other by an actuator.

In the above-described methods in accordance with the invention, two of the three parts 87, 89, 91 of the housing 57 are manipulated during aligning the main lens 53 and the auxiliary lens 55 relative to each other. It is noted that in accordance with a method according to the invention, in general, at least one of the two mounting elements of one of the lens elements is manipulated during the alignment and, subsequently, secured to the housing of the lens system. The fixation relative to each other of the three parts 87, 89, 91 of the housing 57 in the above-described examples of the method in accordance with the invention should consequently be construed as securing the mounting elements 65, 67 to the housing 57.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A method of manufacturing an optical lens system comprising the steps of:
  providing a housing;
  providing a first lens element having a first optical axis and defining a first plane;
  providing a second lens element having a second optical axis and defining a second plane;
  aligning the first and second lens elements relative to each other such that the optical axes of the lens elements coincide;
  providing two elastically deformable mounting elements:
  securing at least the first lens element to the housing using the two mounting elements which, when viewed parallel to the first optical axis after mounting, are arranged separated from each other by a distance and wherein each mounting element individually allows tilting of the first lens element about tilting axes extending perpendicularly to the first optical axis, and wherein each mounting element individually is substantially undeformable in directions at right angles to the first optical axis; and displacing at least one of the mounting elements before being secured to the housing, in a direction transverse to the first optical axis to bring the planes of the lens elements into mutually parallel positions.

2. The method of claim 1, further comprising the step of, before being secured to the housing, displacing the second lens element in a direction transverse to the second optical axis in order to align the optical axis of the first and second elements relative to each other.

3. The method of claim 1, in which the step of displacing the mounting elements before being secured to the housing, includes displacing both mounting elements over equal distances and in a same direction transverse to the first optical axis in order to center the lens elements relative to each other, and over equal distances, in mutually opposite directions transverse to the first optical axis in order to bring the lens elements into mutually parallel positions.

4. The method of claim 1, in which the step of providing a housing includes:

providing a first part, second part and third part of the housing; and fixing the parts of the housing with respect to each other after the lens elements are aligned relative to each other;

and in which the step of securing at least the first lens element includes:

securing the second lens element to a first part of the housing;

securing a first mounting element to a second part of the housing; and securing a second mounting element to a third part of the housing.

5. The method of claim 4, in which the step of providing a housing includes providing the first part of the housing with a sliding surface which extends transversely to the second optical axis;

providing the second part of the housing with a first sliding surface which extends transversely to the first optical axis and with a second sliding surface which extends transversely to the first optical axis and serves to co-operate with the sliding surface of the first part; and providing the third part of the housing includes providing a sliding surface which extends transversely to the first optical axis and serves to co-operate with the first sliding surface of the second part.

6. The method of claim 4, in which fixing the first part, the second part, and the third part of the housing relative to each other includes gluing to form glued joints.

7. The method of claim 1, in which providing the mounting elements includes providing a first, substantially ring-shaped part which is secured to the housing, and a second, substantially ring-shaped part, which is secured to the first lens element, the ring-shaped parts of a first mounting element being interconnected by at least three bendable bridges which are arranged at regular intervals and which extend in a plane transverse to the first optical axis, while the ring-shaped parts of a second mounting element are interconnected by at least two bendable bridges which extend in a plane transverse to the first optical axis.

8. The method of claim 7, in which providing the mounting elements includes providing each from a single plate of a material.

9. The method of claim 7, in which providing the mounting elements includes providing the first mounting element and the second mounting element with three bendable bridges which are placed at regular intervals.

10. The method of claim 7, in which providing mounting elements includes providing the bendable bridges of the mounting elements with a uniformly bendable spoke which extends substantially in a tangential direction relative to the optical axis of the first lens element.

11. The method of claim 7, in which providing mounting elements includes providing the bendable bridges of the mounting elements with a relatively rigid strip which extends substantially in a tangential direction relative to the optical axis of the first lens element and is connected, via two flexible joints, to the two ring-shaped parts of the relevant mounting element.

12. An optical scanning device comprising:

means for positioning an information carrier for optically scanning an information track;

a radiation source for supplying, in operation, a radiation beam;

an optical lens system having an optical axis for focusing the radiation beam into a scanning spot on the track of the information carrier, the system including:

a housing:

a first lens element having a first optical axis and defining a first plane;

a second element having a second optical axis and defining a second plane;

means for aligning the first and second lens elements relative to each other such that the optical axes coincide with the optical axis of the lens system, including two elastically deformable mounting elements for securing at least the first lens, the two mounting elements being separated from each other by a distance from each other, and each mounting element individually allowing tilting of the first lens element about tilting axes extending perpendicularly to the first optical axis, and the mounting elements being substantially undeformable in directions at right angles to the first optical axis, and a first actuator for displacing the lens system in a direction parallel to the optical axis, and a second actuator for displacing the first lens element relative to the housing for mutually displacing the first lens element and the second lens element, means for allowing displacing at least one of the mounting elements, in a direction traverse to the first optical axis, to bring the planes of the lens elements into mutually parallel position, before being secured in the housing.

13. An optical player comprising:

a table which can be rotated about an axis of rotation;

an optical scanning device for scanning an information track of an optically scannable information carrier which can be arranged on the table; and a displacement device by means of which the scanning device can be displaced, in operation, relative to the axis of rotation, predominantly in a radial direction, including:

a radiation source for supplying, in operation, a radiation beam;

an optical lens system having an optical axis for focusing the radiation beam into a scanning spot on the track of the information carrier, the system including:

a housing:

a first lens element having a first optical axis and defining a first plane;

a second element having a second optical axis and defining a second plane;

means for aligning the first and second lens elements relative to each other such that the optical axes coincide with the optical axis of the lens system, including two elastically deformable mounting elements for securing at least the first lens, the two mounting elements being separated from each other by a distance from each other, and each mounting element individually allowing tilting of the first lens element about tilting axes extending perpendicularly to the first optical axis, and the mounting elements being substantially undeformable in directions at right angles to the first optical axis, means for allowing displacing at least one of the mounting elements, in a direction traverse to the first optical axis, to bring the planes of the lens elements into mutually parallel position, before being secured in the housing;

a first actuator for displacing the lens system in a direction parallel to the optical axis, and a second actuator for mutually displacing the first lens element and the second lens element, and in which the housing of the lens system can be displaced in a direction parallel to the optical axis by the first actuator, while the first lens element of the lens system can be displaced relative to the housing by the second actuator, in a direction parallel to the optical axis.

14. The device of claim 12, further comprising means for allowing displacing the second lens element in a direction transverse to the second optical axis in order to align the optical axis of the first and second elements relative to each other, before being secured to the housing.

15. The device of claim 12, in which the means for allowing displacing the mounting elements are adapted for allowing displacing both mounting elements over equal distances and in a same direction transverse to the first optical axis in order to center the lens elements relative to each other, and over equal distances, in mutually opposite directions transverse to the first optical axis in order to bring the lens elements into mutually parallel positions.

16. The device of claim 12, in which the housing includes:

a first part, second part and third part of the housing, each fixed with respect to the others, the second lens element secured to a first part of the housing, the first mounting element secured to a second part of the housing; and the second mounting element secured to a third part of the housing.

17. The device of claim 16, in which:

the first part of the housing includes a sliding surface which extends transversely to the second optical axis;

the second part of the housing includes a first sliding surface which extends transversely to the first optical axis and with a second sliding surface which extends transversely to the first optical axis and co-operates with the sliding surface of the first part; and the third part of the housing includes a sliding surface which extends transversely to the first optical axis and co-operates with the first sliding surface of the second part.

18. The device of claim 16, in which the first part, the second part, and the third part of the housing are fixed relative to each other by glued joints.

19. The device of claim 16, in which the mounting elements include a first, substantially ring-shaped part which is secured to the housing, and a second, substantially ring-shaped part, which is secured to the first lens element, the ring-shaped parts of a first mounting element being interconnected by at least three bendable bridges which are arranged at regular intervals and which extend in a plane transverse to the first optical axis, while the ring-shaped parts of a second mounting element are interconnected by at least two bendable bridges which extend in a plane transverse to the first optical axis.

20. The device of claim 19, in which the mounting elements are of one continuous material without joints.

21. The device of claim 19, in which the first mounting element and the second mounting element each include three bendable bridges which are placed at regular intervals.

22. The device of claim 19, in which the bendable bridges of the mounting elements include a uniformly bendable spoke which extends substantially in a tangential direction relative to the optical axis of the first lens element.

23. The device of claim 19, in which the bendable bridges of the mounting elements include a relatively rigid strip which extends substantially in a tangential direction relative to the optical axis of the first lens element and is connected, by two flexible joints, to the two ring-shaped parts of the relevant mounting element.

* * * * *